A. LEWIS.
Ore Stamp.
No. 79,581.
Patented July 7, 1868.
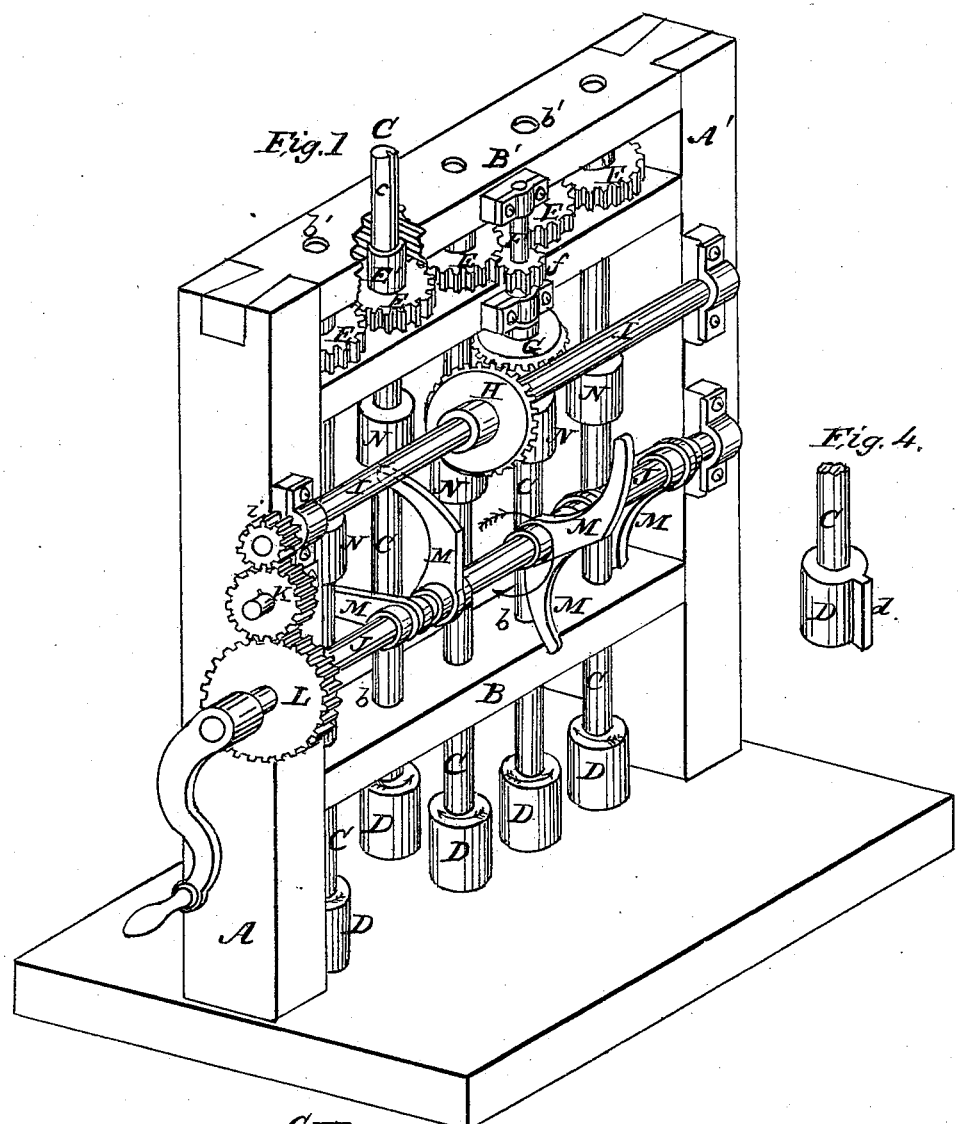
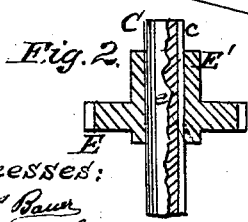
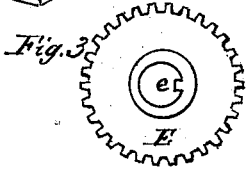
Witnesses:
Inventor:
Alpheus Lewis
By Knight Bros.
Attys.

United States Patent Office.

ALPHEUS LEWIS, OF VIRGINIA CITY, TERRITORY OF MONTANA.

*Letters Patent No. 79,581, dated July 7, 1868.*

IMPROVED QUARTZ-MILL.

*The Schedule referred to in these Letters Patent and making part of the same.*

TO WHOM IT MAY CONCERN:

Be it known that I, ALPHEUS LEWIS, of Virginia City, in the county of Madison, and Territory of Montana, have invented a new and useful Improvement in Quartz-Mills; and I do hereby declare the following to be a full, clear, and exact description thereof, reference being had to the accompanying drawings, making part of this specification.

My invention relates to an arrangement of stamp or stamps revolved at the instant of impact with the ore or gangue, so as more effectually to triturate and comminute the latter.

Figure 1 is a perspective view of a set of stamps adapted for operation on my plan, the battery, trough, and dies being omitted.

Figure 2 is an axial section through one of my feathered cog-wheels and shaft.

Figure 3 is a face view of one of my feathered cog-wheels.

Figure 4 shows a modification of the stamping-head or boss.

The frame of the mill consists of stout vertical and horizontal beams, A A' B B', the latter being provided with perforations, $b\ b'$, for the reception of the stems C, to whose lower ends are attached the customary bosses, D, which serve to pulverize the quartz or other material.

The upper portions of the stems C are provided with longitudinal grooves, $c$, which are adapted to receive feathers, $e$, that project inwardly from the cog-wheels E or their hubs E'.

These wheels E being journalled permanently in the frame, and entirely independent of the stamp-stems, and having eyes through which the stems slide up and down freely, the said wheels give a continuous rotation to the stems, without partaking of their reciprocating motion.

These wheels E are of uniform diameter, and gear with one another, and the entire train of them is propelled by a pinion, $f$, attached to the upper end of a shaft, F, whose bevel-end, G, meshes with another one, H, in the counter-shaft I. Motion is communicated to shaft I, from the cam-shaft J, by the pinion $i$ and wheels K L, although the intermediate wheel, K, may be omitted if desired.

The shaft J has secured to it the tabs or cams M, which correspond in number with the stems C, and these cams are arranged on said shaft in such a manner that the stems are successively elevated, which elevation is effected by the cams coming in contact with the collars N.

These collars N may be attached to the stems by means of set-screws, so as to permit of their being adjusted as occasion may require.

The cam-shaft may be driven either by horse, steam, or water-power.

If preferred, the bosses, D, may be provided with an outwardly-projecting wing or spline, $d$, as shown in fig. 4, or the boss may be furnished with longitudinal flutes or corrugations for the purpose of agitating the material to be crushed.

It will be seen that the stems C and their bosses D are constantly rotating, not only when they are elevated, but also when they are depressed, and in contact with the quartz, by which means the latter is pulverized in about one-half the time which it requires with the old-fashioned stamps, that do not rotate otherwise than while out of contact with the quartz.

If preferred, the groove and feather may be omitted, and the upper portion of the stems may be square, triangular, or in some other non-circular form, and the axial opening in the cog-wheels and their hubs may be of a corresponding shape, so as to permit of the wheels rotating at the same time that the stems are playing within them, or the feather and groove may be reversed, the former being on the shaft and the latter on the wheel.

I do not propose to confine myself to the number of stems here shown, nor to this precise arrangement of gearing-shafts, and so forth, as it is evident that these parts of the mill are susceptible of various modifications without impairing the efficiency of the apparatus.

The mill may be employed for various purposes besides pulverizing ore or gangue.

The cams are preferably so arranged, as shown, upon their shafts, as for their direction of motion to accord with that of their respective stamps, in order to avoid friction and economize power.

Although a single cam only is here shown to each stamp, yet it is evident that two or more cams may be employed to each stamp in company with a slower motion of the cam-shaft.

It will be seen that my stamps are compelled to revolve continuously, both during their upward and downward strokes, by gearing, through which they freely slide, which gearing, not partaking of the sliding motion of the stems in any way, operates continuously without disturbance from said motion.

I claim herein as new, and of my invention—

The train of gear-wheels, E E E, in combination with the series of stamps, D D D, whose stems, C C C, pass up through the eyes of the gear-wheels E, and derive a constant rotation therefrom, substantially as and for the purposes set forth.

In testimony of which invention, I hereunto set my hand.

ALPHEUS LEWIS.

Witnesses:
    GEO. H. KNIGHT,
    JAMES H. LAYMAN.